March 11, 1969   J. P. LINDSEY   3,432,807
SIGNAL INTERPRETATION
Filed July 20, 1967   Sheet 1 of 3

INVENTOR.
J. P. LINDSEY
BY Young & Quigg
ATTORNEYS

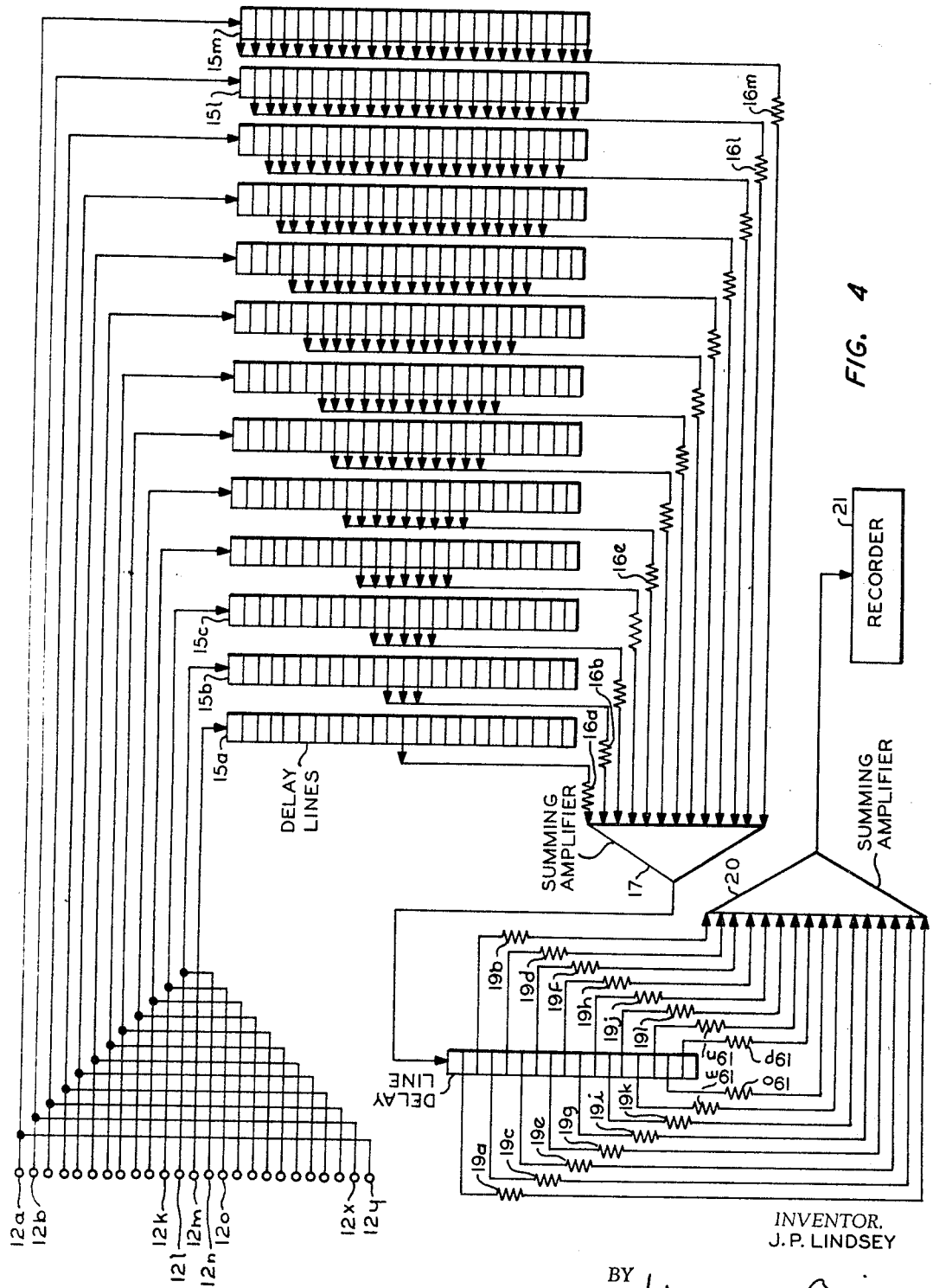

United States Patent Office 3,432,807
Patented Mar. 11, 1969

3,432,807
SIGNAL INTERPRETATION
Joe P. Lindsey, Bartlesville, Okla., assignor to Phillips Petroleum Company, a corporation of Delaware
Filed July 20, 1967, Ser. No. 654,765
U.S. Cl. 340—15.5                           7 Claims
Int. Cl. G01v 1/00

ABSTRACT OF THE DISCLOSURE

In a seismic surveying system, a plurality of seismometers are closely spaced to one another on both sides of the shot point. The signals from the seismometers are combined into a single trace by a velocity filtering procedure to reduce ground waves and shallow multiple reflections. In one embodiment, the filtering is accomplished by the use of tapped delay lines and summing amplifiers.

---

This invention relates to geophysical prospecting by seismic surveying. In another aspect it relates to the filtering of electrical signals.

In geophysical prospecting, it is common practice to impart vibrations to the earth and to position a plurality of seismometers in spaced relationship to the vibration imparting point to measure vibrations which are reflected back to the surface of subterranean formations. Unfortunately, it is often difficult, if not impossible, to recognize the desired seismic reflections in the resulting records. This is due to the fact that extraneous vibrations are also recorded and tend to obscure the desired reflections. Various procedures have been developed to reduce the effect of these extraneous vibrations. One such procedure involves summing a plurality of seismometer records so as to enhance the desired reflections and minimize random vibrations. Other procedures involve filtering the records to eliminate signals of frequencies other than the frequencies of the desired reflections, which are usually in the order of 100 cycles per second or less. However, there are still many areas wherein it is impossible to obtain satisfactory seismic records.

In accordance with one aspect of this invention a method is provided for recording seismometer outputs in such a manner as to eliminate certain undesired signals. This method is particularly useful in eliminating surface waves which travel generally horizontally from the shot point to the seismometers. Multiple reflections from formations adjacent the surface of the earth are also eliminated or minimized. These objectives are attained by the use of a plurality of seismometers which are spaced quite closely to one another. The outputs of the seismometers are transmitted through a velocity filtering network to eliminate the surface waves and multiple reflections. In one embodiment, the seismometer output signals are selectively combined and applied to the inputs of individual signal delay means. The selective outputs of the delay means are in turn combined and applied to the input of a zero phase derivative filter. The delay means and the filter are selected so that only signals recorded are those which have a selected apparent horizontal velocity with respect to adjacent seismometers.

Accordingly, it is an object of this invention to provide a system for seismic surveying wherein vibrations having apparent velocities outside a given range are rejected. Another object is to provide novel filter systems which utilize a plurality of signal delay and summing means.

Other objects, advantages and features of the invention should become apparent from the following detailed discussion, taken in conjunction with the accompanying drawing in which:

FIGURE 4 is a schematic circuit drawing of apparatus employed to transform and record seismic signals in accordance with this invention.

Figure 1:
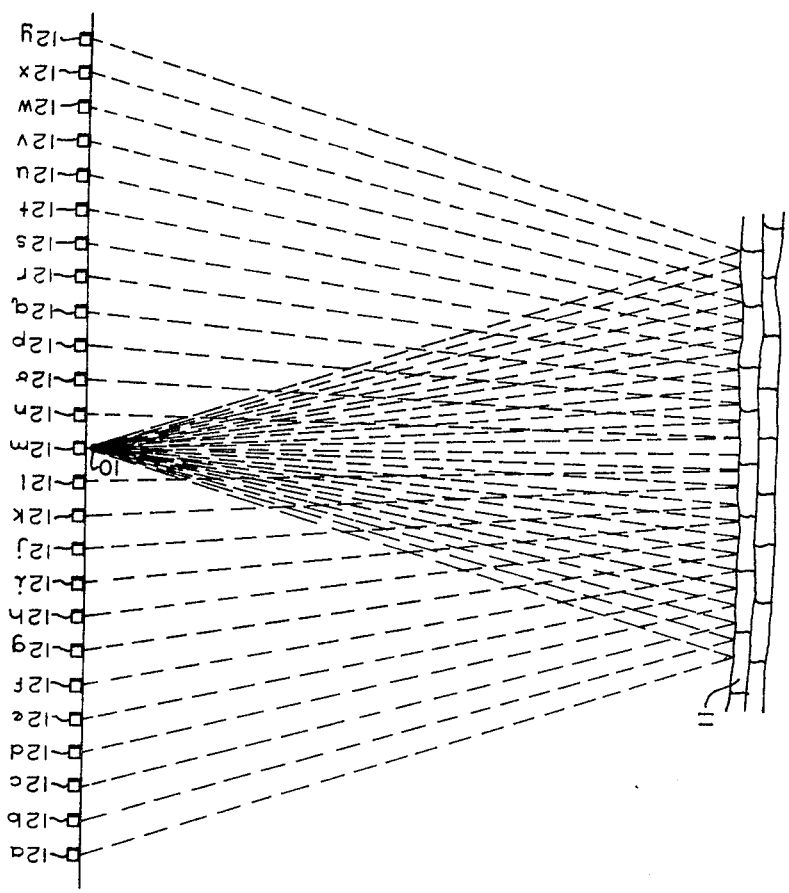
FIGURE 1 is a schematic representation of a seismic exploration system which is used in carrying out the method of this invention.

Referring now to the drawing in detail and to FIGURE 1 in particular, vibrations are imparted to the earth, such as by detonating an explosive charge 10. However, other systems for imparting vibrations can also be employed. The resulting vibrations travel downwardly and are reflected from a formation 11 back to the surface of the earth. A plurality of seismometers $12a$, $12b$ ... $12y$ are positioned to receive the reflected vibrations. These seismometers are spaced much more closely together than is common in normal geophysical prospecting. For example, the distance between adjacent seismometers is in the range of 10 to 40 feet, with a distance of 25 feet being typical. The seismometers are devices which are capable of establishing output electrical signals, the amplitudes of which are representative of the amplitudes of vibrations received by the seismometers.

Figure 2:
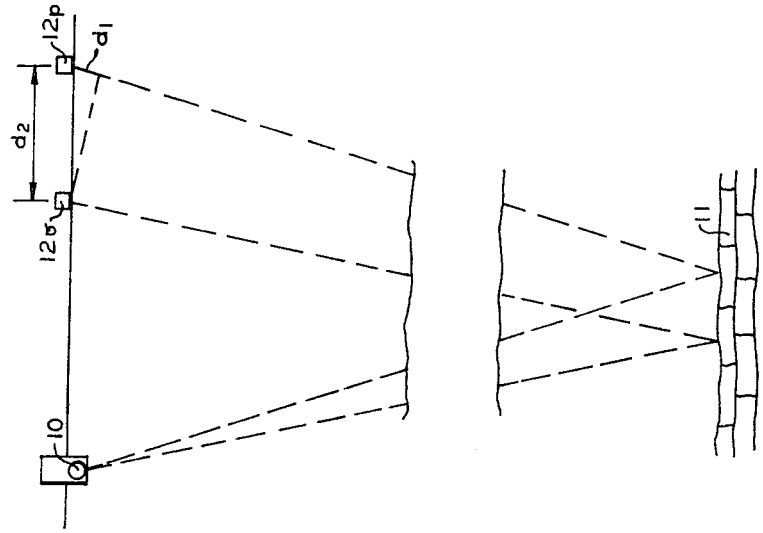
FIGURE 2 is a schematic view illustrating operating features of this invention.

FIGURE 2 illustrates schematically reflected vibrations which are received by two seismometers, such as $12o$ and $12p$. It can be seen that the reflected vibrations received by seismometer $12p$ occur at a later time due to the longer travel path. This difference in travel path is designated as distance $d_1$. The difference in time at which the two seismometers receive corresponding vibrations is a direct function of this distance $d_1$ and the velocity of propagation of the vibrations. The horizontal distance between the two seismometers is designated as $d_2$. The difference in time at which the two seismometers receive horizontally traveling vibrations from the shot hole is a function of distance $d_2$ and the velocity of propagation. In view of the fact that most reflecting beds 11 are located at depths substantially greater than the horizontal spread of the seismometers, distance $d_2$ is considerably greater than distance $d_1$. The term "apparent velocity" is employed herein to designate the velocity of propagation of a wave front which appears to be received sequentially by adjacent seismometers. For a horizontally travelling wave, this apparent velocity is the actual velocity of the wave. For reflected vibrations, this velocity is substantially larger than the actual velocity of the reflected waves and is indicative of the sequential arrival of common reflections at adjacent seismometers. In accordance with this invention the seismic signals are filtered and summed in such a manner as to eliminate apparent velocities below a predetermined vlaue. This reduces extraneous vibrations which occur near the surface.

The velocity filtering employed in this invention utilizes a filter network which is designed to reject signals of relatively low apparent velocity across the seismometer spread. The desired response of such a filter network can be represented by the three dimensional graph of FIGURE 3, which is a plot of relative response (B) versus wave number ($k$) and frequency ($f$). It is desired that the response of the filter network be represented by the illustrated pie-shaped solid. This solid can be approximated by the expression:

$$B\left(-\frac{|f|d}{v_0}, \frac{|f|d}{v_0}\right) = \sum_{n=-N}^{N}\left[2\frac{|f|d}{v}\left(\frac{\sin 2\pi n \frac{|f|d}{v_0}}{2\pi n \frac{|f|d}{v_0}}\right)\right]\cos 2\pi nkd \quad (1)$$

wherein $f$ is frequency, $d$ is the horizontal spacing between adjacent seismometers (distance $d_2$ in FIGURE 2), $v_0$ is the cut-off velocity (the apparent velocity below which signals will be rejected as noise), $n$ is a number assigned to each seismometer (from $-N$ to $+N$, or $-12$ to $+12$ in the seismometer spread of FIGURE 1), and $k$ is the wave number (reciprocal of wave length).

The mere summing of the outputs of the seismometers of FIGURE 1, without velocity filtering, can be represented by the expression:

$$R_n = \left[ \sum_{n=-N}^{N} [1] \cos 2\pi nkd \right] \cos 2\pi ft \quad (2)$$

where $t$ is time as measured from an origin which is the arrival of the maximum amplitude of the signal (assumed to be sinusoidal) at the center seismometer $12m$ of FIGURE 1. In order that the summed response of individual filter elements associated with each seismometer in the method of this invention approximate the configuration illustrated in FIGURE 3, the constant unity coefficient shown in Expression 2 is replaced with:

$$Ao - 2\frac{|f|d}{v_0} \quad (3)$$

where $n = 0$ $$An(f) = \left[ 2\frac{|f|d}{v_0} \left( \frac{\sin 2\pi n \frac{|f|d}{v_0}}{2\pi n \frac{|f|d}{v_0}} \right) \right]$$

where $n = -N \ldots -1, +1 \ldots N$. The response of one such filter element is represented by numeral 13 in FIGURE 3. Thus, the ideal response can be represented by the expression:

$$\bar{R} = \sum_{n=-N}^{N} \bar{R}_n = \cos 2\pi ft \left[ \sum_{n=-N}^{N} A_n(f) \cos 2\pi nkd \right] = (\cos 2\pi ft) B\left(\frac{-|f|d}{v_0}, \frac{|f|d}{v_0}\right) \quad (4)$$

In order to obtain the weighted value for the filter elements associated with each individual seismometer, a Fourier inversion is performed, as described in Campbell and Foster, "Fourier Integrals for Practical Applications," Van Nostrand & Co., 1942, p. 77. This gives the time transforms of the Fourier series, which are as follows:

$$a_n(t) = \frac{1}{\pi 2} \cdot \frac{\frac{d}{v_0}}{\left(\frac{nd^2}{v_0} - t^2\right)} = \frac{1}{\pi 2} \frac{\zeta}{(n^2 \tau^2 - t^2)}; \; n \neq 0 \quad (5)$$

$$a_0(t) = -\frac{1}{\pi 2} \frac{\frac{d}{v_0}}{t^2} + \delta(t) = -\frac{\zeta}{\pi^2 t^2} + \delta(t) \quad (6)$$

where $\tau$ is $d/v_0$ and represents the cut-off wavelet stepout between seismometers, and $\delta(t)$ is a unit Dirac delta, as defined in Campbell and Foster. While these equations have assumed an odd number of seismometers, and filter units, an even number can be employed in similar fashion. In this case, each filter section will have a response represented by the Fourier transform of the expression:

$$An(f) = \frac{\sin 2\pi \frac{|f|}{v_0} d \left[\frac{1}{2} + (n-1)\right]}{\pi \left[\frac{1}{2} + (n-1)\right]} \quad (7)$$

Figure 3:
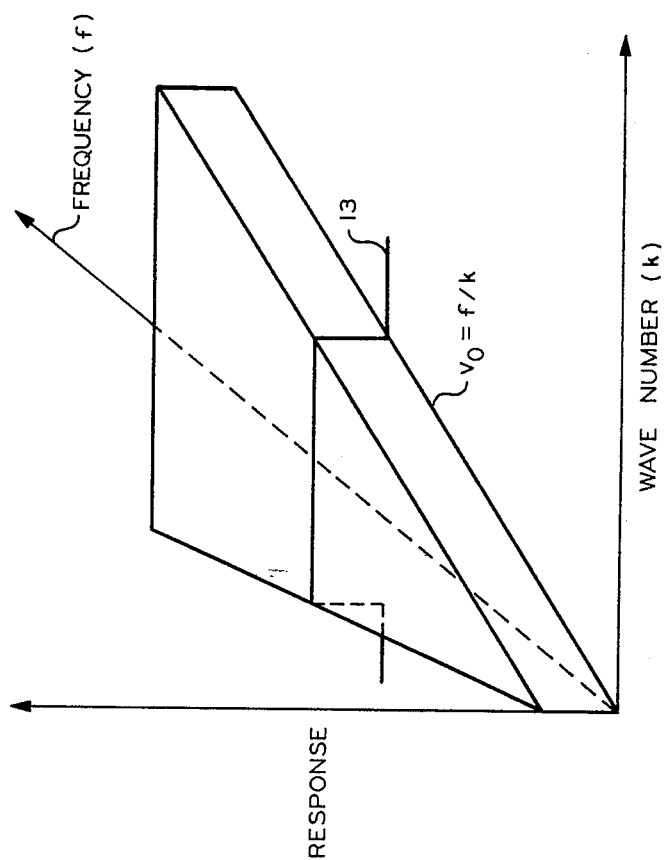
FIGURE 3 is a graphical representation of the response of the filter network employed in this invention.

A specific embodiment of the filtering and summing apparatus of this invention is illustrated schematically in FIGURE 3. The output signal from seismometer $12m$, which is positioned adjacent the shot hole, is applied to the input of a first conventional tapped delay line $15a$.

The output signals from seismometers $12l$ and $12n$ are combined and applied to the input of a second delay line $15b$. Similarly, the outputs of seismometers $12k$ and $12o$ are combined and applied to the input of a third delay line $15c$. The outputs of the remaining pairs of seismometers are similarly combined and applied to the inputs of respective delay lines, the outputs of seismometers $12a$ and $12y$ being applied to the input of the last such delay line $15m$. These delay lines are provided with a plurality of spaced taps so that output signals can be removed with preselected time delays, the delays between adjacent taps on each delay line generally being of the order of a few milliseconds. All 25 output terminals of delay line $15m$ are combined and applied through an input resistor $16m$ to a first terminal of a summing amplifier 17. The center tap of delay line $15a$ is supplied to amplifier 17 through a resistor $16a$. The three centermost taps of delay line $15b$ are applied through a resistor $16b$ to amplifier 17. Similarly, progressively larger numbers of pairs of central terminals of delay lines $15c$, $15d$ . . . $15l$ are applied through respective resistors $16c$, $16d$ . . . $16l$ to amplifier 17.

The delay lines thus far described provide conventional "box car" outputs, of progressively longer duration proceeding from delay line $15a$ to delay line $15m$. The inputs, except to delay line $15a$, can be paired as illustrated because the associated input seismometers are equal distances from the center shot point and thus require filters having the same response.

The output signal from summing amplifier 17 is applied to the input of an additional delay line 18. Delay line 18 is provided with a plurality of spaced taps which are applied to respective inputs of a second summing amplifier 20 through respective resistors $19a$, $19b$ . . . $19p$. The output of amplifier 20 is applied to a recorder 21. In this manner, the outputs of the 25 seismometers are combined by the apparatus of FIGURE 3 to provide a single output trace which is applied to recorder 21.

The circuit of FIGURE 4 provides a "velocity filtering" of the signals received by the seismometers so as to eliminate surface waves and shallow multiple reflections from the final recorded signal. Time delay lines $15a$ to $15m$ can be conventional tapped delay lines which provide delayed pulse outputs when an input pulse is applied. The individual delay lines thus provide "box car" output signals of progressively greater length, proceeding from delay line $15a$ to delay line $15m$. Resistors $16a$ to $16m$ have progressively smaller values in the order named. These resistors are selected so that the product of the resistor value and the number of taps on the associated delay line is a constant for each delay line. For example, resistors $16a$, $16b$, $16c$ . . . $16n$ can have respective values (in megohms) of 15, 5, 3 . . . 0.6. Delay line 18 and the output circuit associated therewith are selected so as to provide a zero phase derivative filter. This can be accomplished, for example, by use of a tapped delay line of the type described in U.S. Patent No. 3,201,706, R. G. Piety, Aug. 17, 1965. This delay line and the summing resistors are selected such that the filter has a response of the form illustrated in FIGURE 1 of this patent when a single input pulse is applied to the input. As described in the Piety patent, the values of the resistors and the taps selected can be adjusted until the network provides the desired output response when single input pulses are applied. The Cardinal function response which is of the form $$\frac{\sin X}{X}$$

of the zero phase derivative filter, provides the corresponding portion of the expressions discussed above.

In a seismic surveying operation employing the method of this invention, a series of vibrations are applied to the earth sequentially at spaced points. This is normally done by detonating explosive charges in shot holes along a line corresponding to the locations of respective seismometers in FIGURE 1. For example, the second charge can be detonated at location 12n, the third at 12o, etc. The seismometers are moved progressively so as to be spaced on both sides of each shot point whenever a charge is detonated, as illustrated in FIGURE 1. This results in a series of records which can be compared in the usual manner to determine the slopes of subterranean reflecting beds. An important feature of this invention resides in the relatively close spacing, 10 to 40 feet, between the seismometers. This narrow spacing, combined with the "velocity filtering," provides signals substantially free of surface waves and shallow multiple reflections. The cut-off velocity employed in designing the filters may be of the order of 15,000 to 30,000 feet per second, or even higher, depending on the formation characteristics. In any event, this cut-off velocity should be such as to eliminate horizontally propagated signals while passing reflections. This method of seismic surveying is particularly useful in marine prospecting because a relatively short string of seismometers is employed. This reduces errors which may result from drifting when longer conventional spreads are used.

The output signals from the seismometers can be applied directly to the filter network for processing in the field. Alternatively, the signals can be recorded in the field, such as by means of a magnetic recorder, for subsequent filtering at a central location. The final output velocity filtered signal can be recorded in any conventional form.

While this invention has been described in conjunction with a presently preferred embodiment, it obviously is not limited thereto.

I claim:
1. The method of seismic surveying which comprises imparting vibrations to the earth at a first location adjacent the surface of the earth; detecting the resulting vibrations which are received adjacent the surface of the earth at a plurality of second locations which are spaced horizontally from one another; establishing electrical signals representative of the detected vibrations; and filtering and combining said electrical signals to provide a composite signal which contains only vibrations that have an apparent horizontal velocity greater than a preselected value, said filtering and combining comprising passing the signals through respective box car filters, the individual responses thereof being proportional in width to the distances that the respective seismometers are spaced from said first location, summing the output signals from the box car filters, and passing the resulting summed signal through a zero phase derivative filter.

2. The method of claim 1 wherein said second locations are spaced from 10 to 40 feet apart along a line which extends on opposite sides of said first location.

3. The method of claim 2 wherein said second locations are approximately 25 feet apart.

4. Apparatus for use in interpreting seismic signals comprising a plurality of electrical signal delay lines, each having an input terminal and a plurality of output terminals which provide output signals of progressively greater delays; a summing amplifier having a plurality of input weighting resistors; means connecting output terminals of each of said first delay lines through an associated one of said input resistors to said summing amplifier, the values of said resistors and the number of output terminals of said first delay lines connected thereto being such that the product of the number of such terminals and the value of the resistor is a constant for each delay line and its associated resistor; and filter means connected to the output of said summing amplifier, said filter means having an output response to provide a zero phase derivative filter.

5. The apparatus of claim 4 wherein said filter means comprises an additional delay line having a plurality of output terminals which provide output signals of progressively greater delays, a second summing amplifier, and means connecting the output terminals of said additional delay line to the inputs of said second summing amplifier.

6. The apparatus of claim 4, further comprising a plurality of seismometers connected in spaced relationship with one another along a line, and means connecting pairs of said seismometers to the inputs of respective ones of at least all but one of said delay lines, the pairs of said seismometers being spaced progressively greater distances from the center of the plurality of seismometers being connected to delay lines having progressively greater numbers of output terminals thereof connected to said summing amplifier.

7. The apparatus of claim 6 wherein the center seismometer along said line is connected to the first of said delay lines, said first delay line has one output terminal connected to said summing amplifier, and wherein the remainder of said delay lines have progressively greater odd numbers of output terminals connected to said summing amplifier.

References Cited

UNITED STATES PATENTS 3,274,541   9/1966   Embree _____ 340—15.5

RICHARD A. FARLEY, *Primary Examiner.*

C. E. WANDS, *Assistant Examiner.*